(12) United States Patent
Nakamura

(10) Patent No.: US 8,902,460 B2
(45) Date of Patent: Dec. 2, 2014

(54) SIGNAL PROCESSING CIRCUIT CONFIGURED TO OPERATE ACCORDING TO VARIOUS CLOCK PATTERNS, IMAGE PROCESSING APPARATUS, AND SIGNAL PROCESSING METHOD PERFORMING THE SAME

(71) Applicant: Masashi Nakamura, Chiba (JP)

(72) Inventor: Masashi Nakamura, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/729,603

(22) Filed: Dec. 28, 2012

(65) Prior Publication Data
US 2013/0176591 A1    Jul. 11, 2013

(30) Foreign Application Priority Data
Jan. 11, 2012  (JP) ................................. 2012-003304

(51) Int. Cl.
*G06F 3/12*      (2006.01)
*H04N 1/00*    (2006.01)

(52) U.S. Cl.
CPC .......... *G06F 3/12* (2013.01); *H04N 2201/0094* (2013.01); *H04N 1/00952* (2013.01); *H04N 1/00933* (2013.01)
USPC ....................................................... 358/1.15

(58) Field of Classification Search
None
See application file for complete search history.

(56) References Cited

U.S. PATENT DOCUMENTS

| | | | | |
|---|---|---|---|---|
| 4,561,024 A | * | 12/1985 | Tamura ........................ | 358/451 |
| 5,070,412 A | * | 12/1991 | Kumamoto et al. .......... | 358/451 |
| 5,293,469 A | | 3/1994 | Outa et al. | |
| 5,495,341 A | * | 2/1996 | Kawana et al. .............. | 358/3.21 |
| 2008/0252929 A1 | * | 10/2008 | Kobayashi ................... | 358/1.15 |

FOREIGN PATENT DOCUMENTS

| | | |
|---|---|---|
| JP | 2001-014451 | 1/2001 |
| JP | 2009-071720 | 4/2009 |

* cited by examiner

*Primary Examiner* — Jeremiah Bryar
(74) *Attorney, Agent, or Firm* — Harness, Dickey & Pierce, P.L.C.

(57) ABSTRACT

A signal processing circuit transfers a signal between an externally connected device and an internal circuit. The signal processing circuit includes a clock selector that selects and outputs any one of clocks received from plural systems; data latch units that respectively latch, according to the respective clocks received from the systems, data pieces being input; a data selector that selects and outputs, among the data pieces latched, a data piece latched according to the selected clock; and a data retaining unit that temporarily retains the data between the data latch units and the internal circuit. When the data is processed between the data retaining unit and the internal circuit, the data retaining unit operates according to an operating clock of the internal circuit, but when the data is processed between the data retaining unit and the data latch units, the data retaining unit operates according to the selected clock.

7 Claims, 17 Drawing Sheets

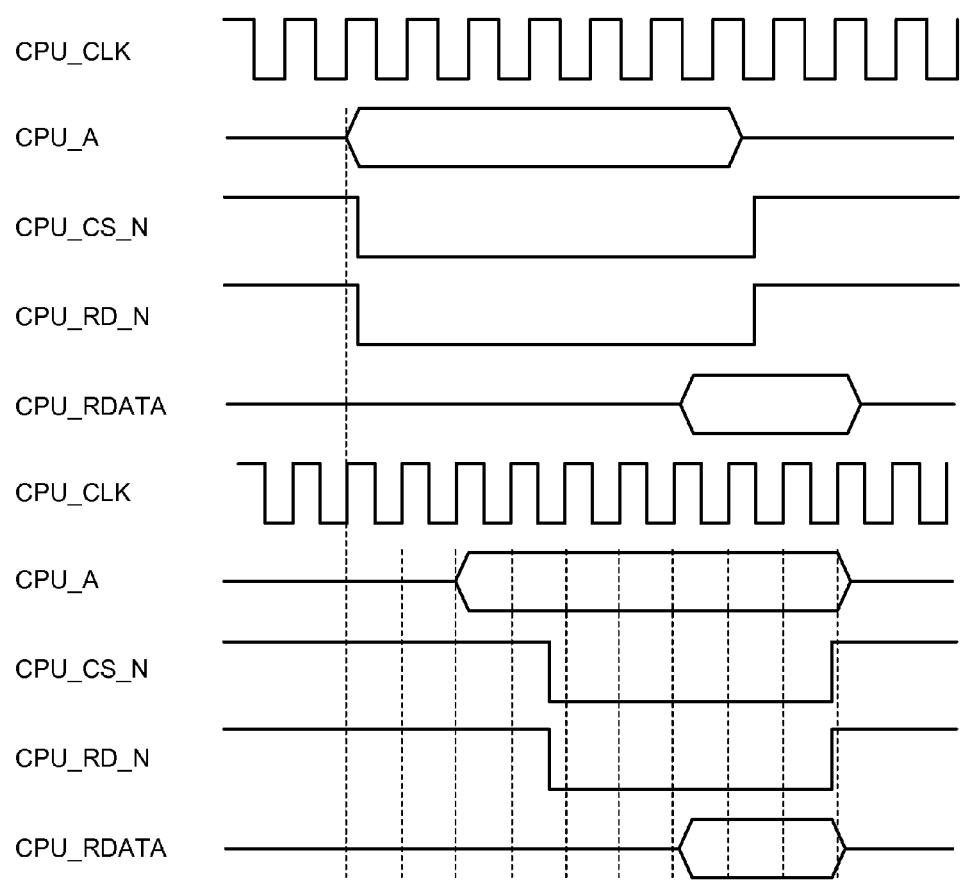

SIGNAL PROCESSING CIRCUIT CONFIGURED TO OPERATE ACCORDING TO VARIOUS CLOCK PATTERNS, IMAGE PROCESSING APPARATUS, AND SIGNAL PROCESSING METHOD PERFORMING THE SAME

CROSS-REFERENCE TO RELATED APPLICATIONS

The present application claims priority to and incorporates by reference the entire contents of Japanese Patent Application No. 2012-003304 filed in Japan on Jan. 11, 2012.

BACKGROUND OF THE INVENTION

1. Field of the Invention

The present invention relates to a signal processing circuit, an image processing apparatus, and a signal processing method.

2. Description of the Related Art

With the recent development of digitization of information, image processing apparatuses, such as printers and facsimiles used for outputting digitalized information and scanners used for digitalizing documents have become indispensable. Such image processing apparatuses are often designed as a multi-function peripheral (MFP) capable of being used as a printer, a facsimile, a scanner, and a copier by including an image capturing function, an image forming function, and a communication function, for example.

In such image processing apparatuses, an image processing application specific integrated circuit (ASIC) that performs processing of read data received from a scanner and processing of image data to be input to a plotter for forming and outputting an image operates based on a clock supplied from a clock generating device, thereby performing the processing described above.

In regard to such clock control, Japanese Patent Application Laid-open No. 2009-071720, for example, discloses a method for enabling use of different clocks for each of various functions mounted on an ASIC. Furthermore, Japanese Patent Application Laid-open No. 2001-014451, for example, discloses a method for specifying the buffer capacity required at the least for a cooperative section to achieve cooperation between a clock synchronous section, such as a circuit that performs image processing, and an asynchronous section processed by an arithmetic device, such as a central processing unit (CPU).

As disclosed in Japanese Patent Application Laid-open No. 2009-071720 and Japanese Patent Application Laid-open No. 2001-014451, while image processing apparatuses are designed as various models, such as a high-spec model, a cheaper model, and a model specializing in a specific function, these models are different from one another in the clock frequency and the clock supply pattern (hereinafter, referred to as a clock pattern). Examples of the difference include whether a spread spectrum clock (SSC) is provided, whether a phase locked loop (PLL) is mounted on the ASIC, whether a spread spectrum clock generator (SSCG) for the SSC is mounted, and whether a clock needs to be supplied from the ASIC to an external device, such as a scanner and a plotter.

Therefore, the ASIC mounted on each product model needs to be designed in accordance with the clock frequency and the clock supply pattern in each model, resulting in a burden in designing and an increase in cost of the apparatus. However, such problems do not necessarily occur in the image processing ASIC described above. Any signal processing circuit that transfers a signal between an externally connected device and an internal circuit may possibly have the same problems.

Therefore, there is a need for a signal processing circuit that is compatible with various clock patterns.

SUMMARY OF THE INVENTION

According to an embodiment, there is provided a signal processing circuit that transfers a signal between an externally connected device and an internal circuit. The signal processing circuit includes a clock selecting unit that selects and outputs any one of clocks received from a plurality of different systems; a plurality of data latch units that respectively latch, according to the respective clocks received from the systems, a plurality of pieces of data being input; a data selecting unit that selects and outputs, among the pieces of data latched by the data latch units, a piece of data latched according to the selected clock; and a data retaining unit that temporarily retains the data between the data latch units and the internal circuit. When the data is processed between the data retaining unit and the internal circuit, the data retaining unit operates according to an operating clock of the internal circuit, but when the data is processed between the data retaining unit and the data latch units, the data retaining unit operates according to the selected clock.

According to another embodiment, there is provided an image processing apparatus that includes an image processing engine; an image processing circuit; and a signal processing circuit that transfers a signal between the image processing engine and the image processing circuit. The signal processing circuit includes a clock selecting unit that selects and outputs any one of clocks received from a plurality of different systems; a plurality of data latch unit that respectively latch, according to the respective clocks received from the systems, a plurality of pieces of data being input; a data selecting unit that selects and outputs, among the pieces of data latched by the data latch units, a piece of data latched according to the selected clock; and a data retaining unit that temporarily retains the data between the data latch units and the image processing circuit. When the data is processed between the data retaining unit and the image processing circuit, the data retaining unit operates according to an operating clock of the image processing circuit, but when the data is processed between the data retaining unit and the data latch units, the data retaining unit operates according to the selected clock.

According to still another embodiment, there is provided a signal processing method for transferring a signal between an externally connected device and an internal circuit. The signal processing method includes selecting and outputting any one of clocks received from a plurality of different systems; respectively latching, according to the respective clocks received from the systems, a plurality of pieces of data being input; selecting and outputting, among the pieces of data latched, a piece of data latched according to the selected clock; and temporarily retaining the data in a storage medium between data latch units that latch the pieces of data and the internal circuit. At the temporarily retaining the data in the storage medium, when the data is processed between the storage medium and the internal circuit, the data is processed according to an operating clock of the internal circuit, but when the data is processed between the storage medium and the data latch units, the data is processed according to the selected clock.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21 is a view illustrating an operation timing of a transmitting and receiving circuit according to the embodiment of the present invention.

DETAILED DESCRIPTION OF THE PREFERRED EMBODIMENTS

Exemplary embodiments of the present invention are described below in greater detail with reference to the accompanying drawings. In a first embodiment, an image processing apparatus formed as a multifunction peripheral (MFP) by including a scanner and a plotter is explained as an example. The image processing apparatus according to the present embodiment includes an image processing application specific integrated circuit (ASIC) that processes a read image received from the scanner and an output target image to be input to a plotter for forming and outputting the image. The image processing apparatus according to the present embodiment is characterized in a clock supply pattern in the image processing ASIC.

Figure 1:
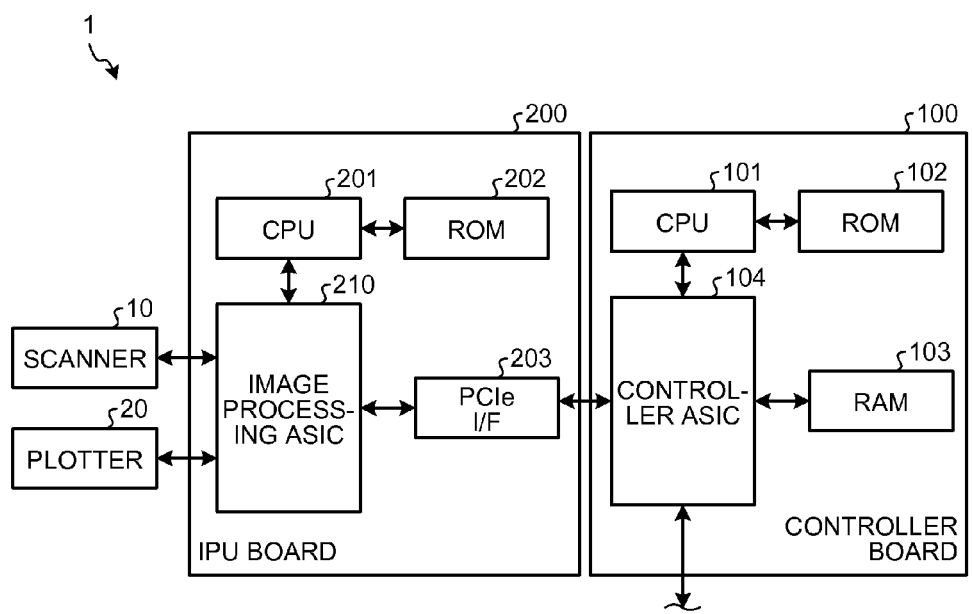
FIG. 1 is a diagram of a configuration of an image processing apparatus according to a first embodiment of the present invention.

FIG. 1 is a block diagram of the entire configuration of an image processing apparatus 1 according to the present embodiment. As illustrated in FIG. 1, the image processing apparatus 1 according to the present embodiment includes a scanner 10, a plotter 20, a controller board 100, and an image processing unit (IPU) board 200. The scanner 10 is a document scanning unit that optically scans a document to generate a read image of the document. A charge coupled device (CCD) and a contact image sensor (CIS) may be used as an image capturing device that reads a document in the scanner 10.

The plotter 20 is an image forming unit that forms and outputs an image onto a sheet. An electrophotography image forming mechanism and an inkjet image forming mechanism may be employed as a mechanism that forms and outputs an image onto a sheet in the plotter 20, for example.

The controller board 100 is a control unit that collectively controls the image processing apparatus 1 and includes a central processing unit (CPU) 101, a read-only memory (ROM) 102, a random access memory (RAM) 103, and a controller ASIC 104. The CPU 101 is an arithmetic unit and collectively controls operations of the controller board 100. The ROM 102 is a read-only storage medium and stores therein a software program that controls the operations of the controller board 100, for example. The RAM 103 is a volatile storage medium capable of high-speed reading and writing of information and is used as a work area for the CPU 101 to process information.

The controller ASIC 104 connects various functions mounted on the controller board 100. In addition to the CPU 101 and the RAM 103, a non-volatile storage medium, such as a hard disk drive (HDD), and a display unit and an operating unit, such as a display panel, are connected to the controller ASIC. Furthermore, the image processing apparatus 1 can be connected to a local area network (LAN) and the Internet via a network interface (I/F) mounted on the controller ASIC 104, for example. The image processing apparatus 1 can communicate with a personal computer (PC) and a server via the network. With this configuration, the CPU 101 performs an operation in accordance with the software program loaded on the RAM 103, thereby realizing functions of the controller board 100.

The IPU board 200 is an image processing control unit that controls the scanner 10 and the plotter 20 in the image processing apparatus 1 and includes a CPU 201, a ROM 202, a peripheral component interface express (PCIe) I/F 203, and an image processing ASIC 210. The CPU 201 is an arithmetic unit and collectively controls operations of the IPU board 200. The ROM 202 is a read-only storage medium and stores therein a software program that controls the operations of the IPU board 200, for example.

The PCIe I/F 203 is an interface that transmits and receives information to and from the controller ASIC 104 via a PCIe bus. The image processing ASIC 210 is an image processing circuit that processes information of a read image received from the scanner 10 and an output target image to be input to the plotter 20. Supply control of a clock performed by the image processing ASIC 210 is the gist according to the present embodiment.

Figure 2A:
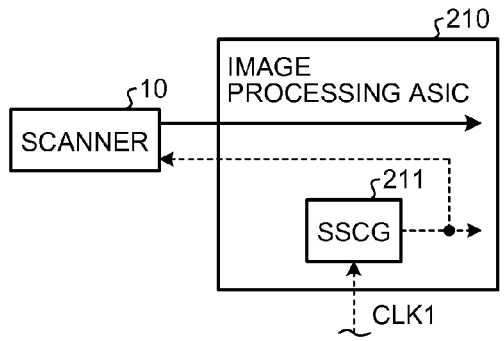
FIGS. 2A to 2D are diagrams of examples of a connection relationship between an image processing ASIC and a scanner, and a clock supply pattern according to the embodiment of the present invention.

A connection relationship between the image processing ASIC 210 and the scanner 10 or the plotter 20 and a clock supply pattern according to the present embodiment will now be described. FIGS. 2A to 2D are diagrams of clock supply control patterns in the connection relationship between the image processing ASIC 210 and the scanner 10. FIG. 2A illustrates the case where the image processing ASIC 210 supplies a clock to the scanner 10, and a spread spectrum clock generator (SSCG) 211 is provided in the image processing ASIC 210.

In the case of FIG. 2A, the SSCG 211 multiplies CLK1 serving as a clock supplied from the outside of the image processing ASIC 210 and performs spread spectrum processing to output it. The clock output from the SSCG 211 is used as a clock for acquiring image data to be received from the scanner 10 in the image processing ASIC 210 and is supplied to the scanner 10 as a clock for outputting the image data.

Figure 2B:
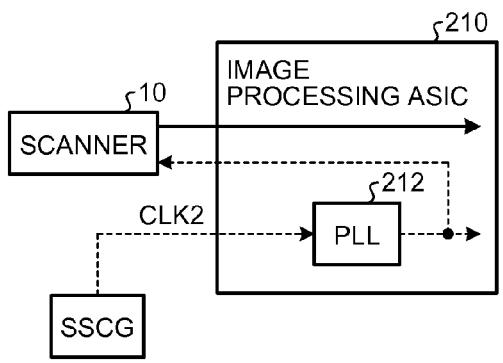

FIG. 2B illustrates the case where the image processing ASIC 210 supplies a clock to the scanner 10 and a phase locked loop (PLL) 212 is provided in the image processing ASIC 210. In the case of FIG. 2B, the PLL 212 multiplies CLK2, which is a clock on which an external SSCG performs spread spectrum processing and is received therefrom, and outputs it. The clock output from the PLL 212 is used in the image processing ASIC 210 and the scanner 10 in the same manner as in the case of FIG. 2A.

Figure 2C:
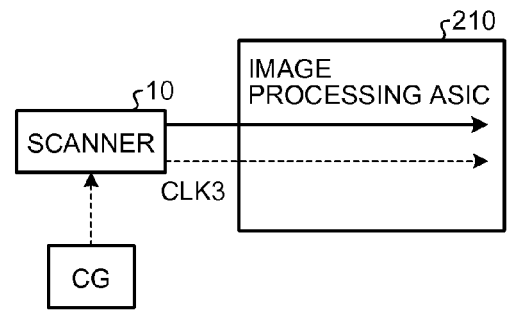

FIG. 2C illustrates the case where the scanner 10 supplies a clock to the image processing ASIC 210. In this case, a clock supplied from an external clock generator (CG) to the scanner 10 is supplied from the scanner 10 to the image processing ASIC 210 as CLK3 serving as a clock.

Figure 2D:
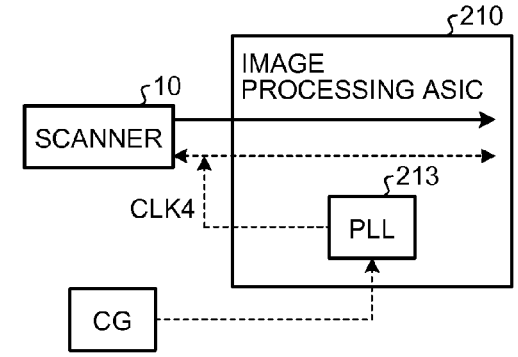

FIG. 2D illustrates the case where a clock is supplied to both the scanner 10 and the image processing ASIC 210. In the case of FIG. 2D, a clock supplied from an external CG to the image processing ASIC 210 is multiplied by a PLL 213 provided in the image processing ASIC 210 and then is output. The clock output from the PLL 213 is output to the outside of the image processing ASIC 210 and supplied to the scanner 10. In addition, the clock is resupplied to the image processing ASIC 210 as CLK4 serving as a clock.

In the pattern illustrated in FIG. 2D, to synchronize the phase of the clock supplied from the PLL 213 to the scanner 10 and the phase of the clock in the image processing ASIC 210, the clock timing is delayed not by using the clock output from the PLL 213 directly in the image processing ASIC 210, but by resupplying the clock from the outside of the image processing ASIC 210.

Figure 3A:
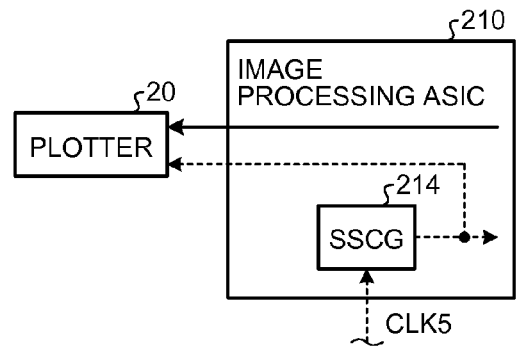
FIGS. 3A to 3C are diagrams of examples of a connection relationship between the image processing ASIC and a plotter and a clock supply pattern according to the embodiment of the present invention.
Figure 3B:
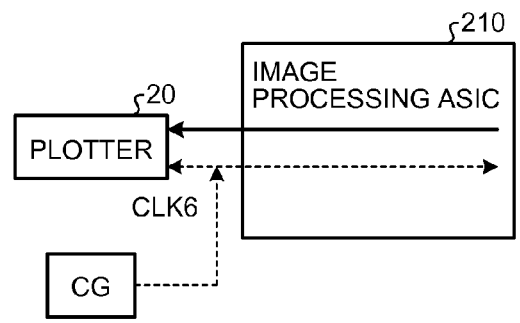
Figure 3C:
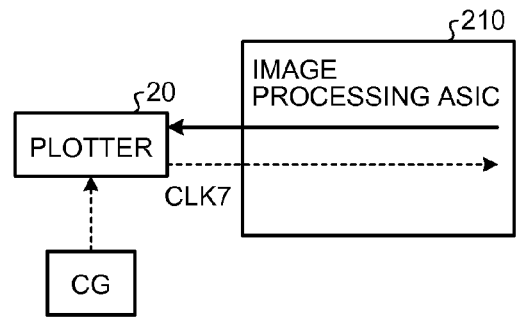

FIGS. 3A to 3C are diagrams of clock supply patterns in the connection relationship between the image processing ASIC 210 and the plotter 20. FIG. 3A illustrates the case where the image processing ASIC 210 supplies a clock to the plotter 20 and an SSCG 214 is provided in the image processing ASIC 210.

In the case of FIG. 3A, the SSCG 214 multiplies CLK5 serving as a clock supplied from the outside of the image processing ASIC 210 and performs spread spectrum processing to output it. The clock output from the SSCG 214 is used as a clock for outputting image data to the plotter 20 in the image processing ASIC 210 and is supplied to the plotter 20 as a clock for acquiring and outputting the image data.

FIG. 3B illustrates the case where a clock is supplied to both the plotter 20 and the image processing ASIC 210. In the case of FIG. 3B, CLK6 serving as a clock is supplied from an external CG to the plotter 20 and the image processing ASIC 210. FIG. 3C illustrates the case where the plotter 20 supplies a clock to the image processing ASIC 210. In this case, a clock supplied from an external CG to the plotter 20 is supplied from the plotter 20 to the image processing ASIC 210 as CLK7 serving as a clock.

Figure 4:
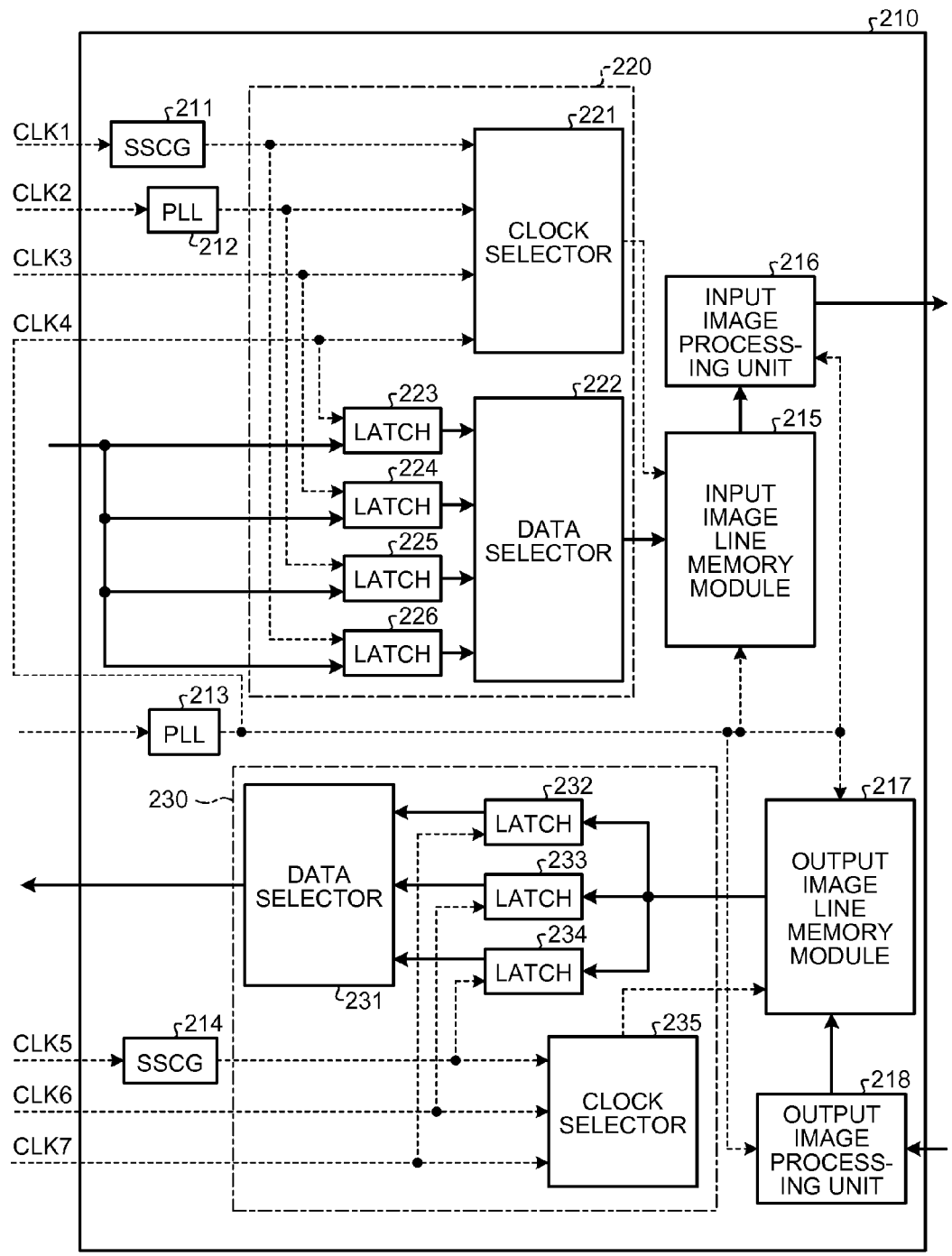
FIG. 4 is a diagram of a configuration of the image processing ASIC according to the embodiment of the present invention.

As described above, there are various patterns of clock supply from the image processing ASIC 210 to the scanner 10 and the plotter 20. The image processing ASIC 210 according to the present embodiment is compatible with various patterns of clock supply. FIG. 4 is a block diagram of a configuration of the image processing ASIC 210 according to the present embodiment. To simplify the illustration, a clock signal is represented by a dashed arrow, and a data signal is represented by a solid arrow in FIG. 4.

As illustrated in FIG. 4, the image processing ASIC 210 according to the present embodiment includes an input image line memory module 215, an input image processing unit 216, an output image line memory module 217, an output image processing unit 218, an input image interface circuit 220, and an output image interface circuit 230 in addition to the SSCG 211, the PLL 212, the PLL 213, and the SSCG 214 explained in FIGS. 2A to 2D and FIGS. 3A to 3C.

The input image line memory module 215 is a memory module including a storage medium that temporarily stores therein a read image received from the scanner 10 for each main-scanning line. The input image line memory module 215 will be described later in detail. The input image processing unit 216 is an image processing circuit that performs necessary image processing on a read image read from the input image line memory module 215. Information of the read image processed by the input image processing unit 216 is input to the controller board 100 via the PCIe I/F 203.

The output image line memory module 217 is a memory module including a storage medium that temporarily stores therein an output target image that is formed and output by the plotter 20 for each main-scanning line. The output image line memory module 217 will be described later in detail. The output image processing unit 218 is an image processing circuit that performs necessary image processing on an output target image to be retained in the output image line memory module 217. The output image processing unit 218 receives an output target image from the controller board 100 via the PCIe I/F 203.

As explained in FIGS. 2A to 2D, the input image interface circuit 220 is a circuit that provides a function compatible with various connection patterns and clock supply patterns with respect to the scanner 10. The input image interface circuit 220 includes a clock selector 221, a data selector 222, and data latches 223 to 226. The clock selector 221 is a clock selecting unit that has input terminals to which CLK1 to CLK4 serving as various clocks explained in FIGS. 2A to 2D are input and selects, and outputs any one of the clocks. The clock selector 221 selects a clock to be output under the control of the CPU 201.

The data latches 223 to 226 are data latch units that latch and output image information of a read image received from the scanner 10 according to their corresponding clocks. The data latch 223 is a data latch circuit corresponding to CLK1, for example, and latches input data according to the clock on which spectrum spread processing is performed by the SSCG 211, and outputs the data to the data selector 222.

The data selector 222 is a data selecting unit that selects any one piece of the image information of the read images latched by the data latches 223 to 226, and inputs the selected image information to the input image line memory module 215. The data selector 222 selects any one piece of the image information of the read images latched by the data latches 223 to 226 under the control of the CPU 201. In the input image line memory module 215, the data selected and output by the data selector 222 is stored in a storage area according to the clock selected and output by the clock selector 221. In other words, the input image line memory module 215 is a data retaining unit that temporarily retains data between the input image processing unit 216 serving as an internal circuit and the data latches 223 to 226.

As explained in FIGS. 3A to 3C, the output image interface circuit 230 is a circuit that provides a function compatible with various connection patterns and clock supply patterns with respect to the plotter 20. The output image interface circuit 230 includes a data selector 231, data latches 232 to 234, and a clock selector 235. The clock selector 235 has input terminals to which CLK5 to CLK7 serving as various clocks explained in FIGS. 3A to 3C are input, and selects and outputs any one of the clocks. The clock selector 235 selects a clock to be output under the control of the CPU 201.

The data latches 232 to 234 latch and output image information of an output target image read from the output image line memory module 217 according to their corresponding clocks. The data latch 232 is a data latch circuit corresponding to CLK7, for example. The data latch 232 latches data read from the output image line memory module 217 and outputs the data to the data selector 231 according to CLK7 received from the plotter 20 as illustrated in FIG. 3C.

In the output image line memory module 217, image information of a read image temporarily retained is read according to the clock selected and output by the clock selector 235. The data selector 231 selects any one piece of the image information of the read images latched by the data latches 232 to 234 and inputs the image information to the plotter 20. The data selector 231 selects any one piece of the image information of the read images latched by the data latches 232 to 234 under the control of the CPU 201. In other words, the output image line memory module 217 is a data retaining unit that temporarily retains data between the output image processing unit 218 serving as an internal circuit and the data latches 232 to 234.

As described above, the input image interface circuit 220 included in the image processing ASIC 210 according to the present embodiment selects any one of a plurality of input terminals for clocks to input a clock to the input image line memory module 215 under the control of the CPU 201. In addition, the input image interface circuit 220 inputs image data of a read image latched by the clock selected to the input image line memory module 215.

The output image interface circuit 230 selects any one of a plurality of input terminals for clocks to input a clock to the output image line memory module 217 under the control of the CPU 201, whereby image data is read from the output image line memory module 217. The image data of the output target image read from the output image line memory module 217 and latched by the clock selected is selected by the data selector 231 and supplied to the plotter 20.

Therefore, the image processing ASIC 210 according to the present embodiment is compatible with various connection patterns and clock supply patterns with respect to the scanner 10 and the plotter 20 and can be used as an image processing circuit compatible with a plurality of different models.

Among the clocks supplied to the image processing ASIC 210, CLK4 output from the PLL 213 is a clock at the highest frequency. Therefore, a module arranged closer to the PCIe I/F 203 than the line memories in the image processing ASIC 210 operates based on CLK4. Thus, it is possible to improve the processing efficiency in the image processing ASIC 210.

Figure 5:
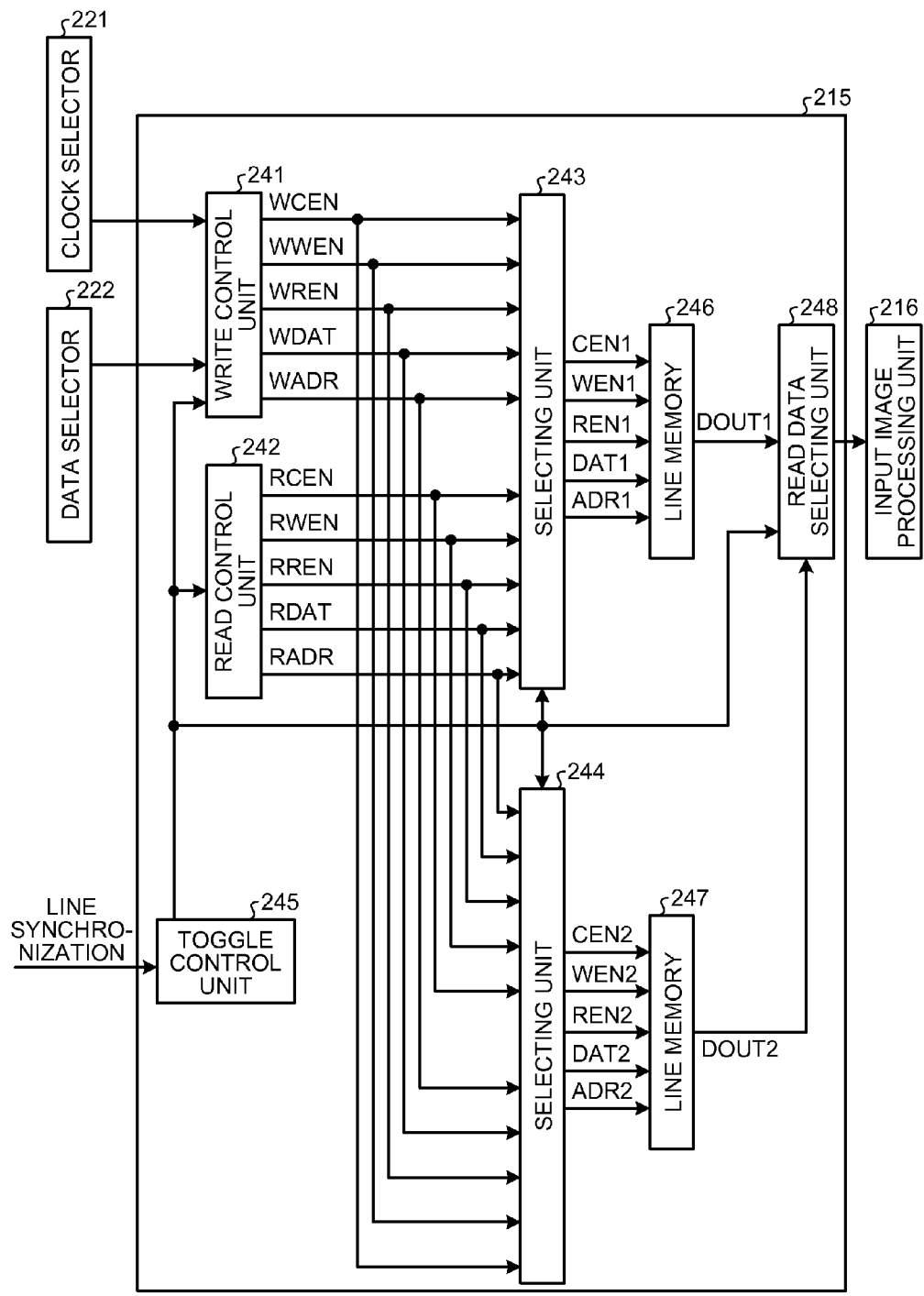
FIG. 5 is a diagram of a configuration of an input image line memory module according to the embodiment of the present invention.

The input image line memory module 215 will now be described. FIG. 5 is a diagram illustrating the input image line memory module 215 according to the present embodiment in detail. As illustrated in FIG. 5, the input image line memory module 215 according to the present embodiment includes a write control unit 241, a read control unit 242, a selecting unit 243, a selecting unit 244, a line memory 246, a line memory 247, and a read data selecting unit 248.

As illustrated in FIG. 5, a clock selected by the clock selector 221 and data selected by the data selector 222 are input to the write control unit 241. The write control unit 241 generates a control signal for writing the data to one of the line memories 246 and 247. In other words, in the input image line memory module 215, the write control unit 241 that exchanges data with the data latches 223 to 226 processes the data according to the clock selected by the clock selector 221.

As illustrated in FIG. 5, the number of line memories provided in the present embodiment is two. In the case of color RGB, if two line memories are provided for each of the three colors RGB, six line memoires are provided in total.

The write control unit 241 outputs an enable signal WCEN, a write enable signal WWEN, a read enable signal WREN, data WDAT, and an address WADR as control signals for write control on the line memory. Because no data is read from the memory in the write control, WWEN is generated as a signal that does not affect the operations by outputting a fixed value "High", for example.

An explanation will be made of a read operation from the line memories 246 and 247 to transmit data written in the line memories 246 and 247 to the input image processing unit 216. The read control unit 242 outputs an enable signal RCEN, a write enable signal RWEN, a read enable signal RREN, data RDAT, and an address RADR as control signals for read control on the line memories 246 and 247 based on an internal clock generated by the PLL 213.

In other words, the read control unit 242 that exchanges data with the input image processing unit 216 serving as an internal circuit in the input image line memory module 215 processes the data according to an operating clock of the internal circuit. Because no data is written to the memory in the read control, RDAT and RWEN are generated as signals that do not affect the operations by outputting a fixed value "High", for example.

The bit width of data (WRDAT and RRDAT) and addresses (WADR and RADR) serving as the control signals described above is determined depending on the system configuration. If externally input data is 8-bit RGB, for example, the bit width is 8-bit. The bit width of addresses is also determined depending on the system configuration. The addresses are addresses in the line memories 246 and 247. The line memory has a memory configuration with a memory capacity of a width of one line read by the scanner so as to store therein image data of a main-scanning line. To read A4-size data with a longitudinal direction of 297 mm by 600 dpi, for example, the line memory has a memory capacity of 7016 pixels or more. In this case, 8-bit width×13-bit address is obtained.

These control signals from the write control unit 241 and the read control unit 242 to the line memories are input to the selecting units 243 and 244. The selecting units 243 and 244 are provided in a manner corresponding to the line memories 246 and 247, respectively, and output a read control signal or a write control signal based on a toggle signal output from a toggle control unit 245.

Write and read control performed by the two line memories 246 and 247 will now be described. Toggle control is performed on the two line memories 246 and 247 according to a toggle signal output from the toggle control unit 245, thereby causing the two line memories 246 and 247 to perform a write operation or a read operation.

The toggle control unit 245 receives a line synchronization signal serving as a reference signal for each line in input data from the scanner. The toggle control unit 245 outputs a toggle signal according to a timing of the line synchronization signal, thereby performing toggle control. If the line memory 246 performs write control, the toggle control performed by the toggle control unit 245 causes the line memory 247 to perform read control. By contrast, if the line memory 246 performs read control, the toggle control causes the line memory 247 to perform write control.

The toggle signal output from the toggle control unit 245 is output to the write control unit 241, the read control unit 242, the selecting units 243 and 244, and the read data selecting unit 248, thereby synchronizing the toggle control performed on the line memory 246 and the line memory 247.

Read data is selected from one of the line memory 246 and the line memory 247 by the toggle signal as output data to the input image processing unit 216, and the data is output in synchronization with a processing timing of the input image processing unit 216. Selection of the read data from the line memory 246 or the line memory 247 and the processing timing are controlled by the read data selecting unit 248. The read data selecting unit 248 selects one of an output DOUT1 and an output DOUT2 from the line memories 246 and 247, respectively, according to the toggle signal and outputs the data thus selected in synchronization with the processing timing of the input image processing unit 216.

Figure 6:
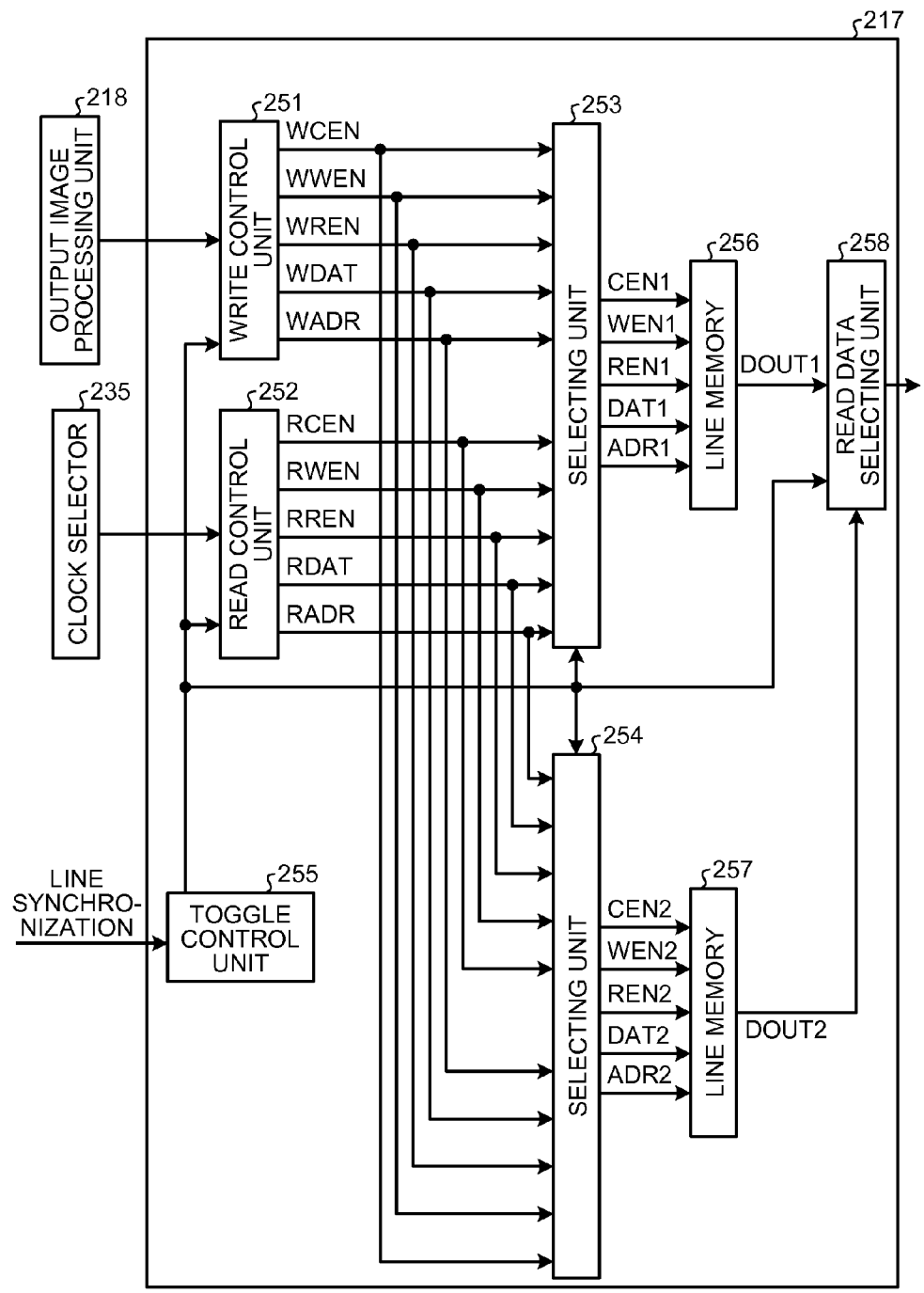
FIG. 6 is a diagram of a configuration of an output image line memory module according to the embodiment of the present invention.

The output image line memory module 217 will now be described. FIG. 6 is a diagram illustrating the output image line memory module 217 according to the present embodiment in detail. As illustrated in FIG. 6, the output image line memory module 217 according to the present embodiment includes a write control unit 251, a read control unit 252, a selecting unit 253, a selecting unit 254, a line memory 256, a line memory 257, and a read data selecting unit 258.

Data of an output target image formed and output by the plotter 20 is read from the RAM 103 and input to the image processing ASIC 210 via the PCIe I/F 203. The data of the output target image is converted into a format capable of being input to the plotter 20 by image processing performed by the output image processing unit 218. Examples of the data of the output target image include read image data read by the scanner 10, processed by the input image processing unit 216, and stored in the RAM 103 and data received from a PC connected to the image processing apparatus 1 via a network and stored in the RAM 103.

The data is input from the output image processing unit 218 to the write control unit 251 according to an operating clock of the output image processing unit 218. The write control unit 251 outputs an enable signal WCEN, a write enable signal WWEN, a read enable signal WREN, data WDAT, and an address WADR as control signals for write control. Because no data reading is performed in the write control, WWEN is generated as a signal that does not affect the operations by outputting a fixed value "High", for example. With these control signals from the write control unit 251, the data is written to the line memories 256 and 257.

An explanation will be made of a read operation to output the data written in the line memories 256 and 257 to the plotter 20. The read control unit 252 outputs an enable signal RCEN, a write enable signal RWEN, a read enable signal RREN, data RDAT, and an address RADR as control signals for read control based on a clock selected by the clock selector 235. Because no data writing is performed in the read control, RDAT and RWEN are generated as signals that do not affect the operations by outputting a fixed value "High", for example. With these control signals from the read control unit 252, the data is read from the line memories 256 and 257.

The bit width of data (WRDAT and RRDAT) and addresses (WADR and RADR) serving as the control signals described above is determined depending on the system configuration. Specifically, the width is determined based on the width of one line of the plotter 20 that outputs and prints data similarly to the case of the scanner described above. Furthermore, the memory configuration capacity is also determined in the similar manner. The system for one output color alone is illustrated in FIG. 6. However, if four colors, such as CMYK, are used, the system is similarly formed for each color, thereby realizing a configuration for four colors.

The control signals from the write control unit 251 and the read control unit 252 to the line memories 256 and 257 are input to the selecting units 253 and 254 for the line memories 256 and 257. The selecting units 253 and 254 are provided in a manner corresponding to the line memories 256 and 257, respectively, and output a read control signal or a write control signal according to a toggle signal output from a toggle control unit 255.

Write and read control performed by the two line memories 256 and 257 will now be described. Toggle control is performed on the two line memories 256 and 257 according to a toggle signal output from the toggle control unit 255, thereby causing the two line memories 256 and 257 to perform a write operation or a read operation. In other words, writing of data from the output image processing unit 218 to the line memory and reading of data to be output to the plotter 20 from the line memory are performed by the toggle control performed on the line memories 256 and 257 similarly to the case of the scanner described above.

The toggle control is performed with a signal generated by the toggle control unit 255. The toggle control unit 255 generates and outputs a toggle signal based on a plotter output line synchronization signal serving as a reference signal for each line in output data to the plotter 20. If the line memory 256 performs write control, the toggle control performed by the toggle control unit 255 causes the line memory 257 to perform read control. By contrast, if the line memory 256 performs read control, the toggle control causes the line memory 257 to perform write control.

The toggle signal output from the toggle control unit 255 is output to the write control unit 251, the read control unit 252, the selecting units 253 and 254, and the read data selecting unit 258, thereby synchronizing the toggle control performed on the line memory 256 and the line memory 257.

Read data is selected from one of the line memory 256 and the line memory 257 as output data to the plotter 20, and the data is output in synchronization with an output timing to the plotter 20. Selection of the read data and control of the processing timing are performed by the read data selecting unit 258. The read data selecting unit 258 selects one of an output DOUT1 and an output DOUT2 from the line memories 256 and 257, respectively, based on the toggle signal and outputs the data thus selected in synchronization with the operation timing of the plotter 20, that is, the operation timing to form and output an image.

Figure 7:
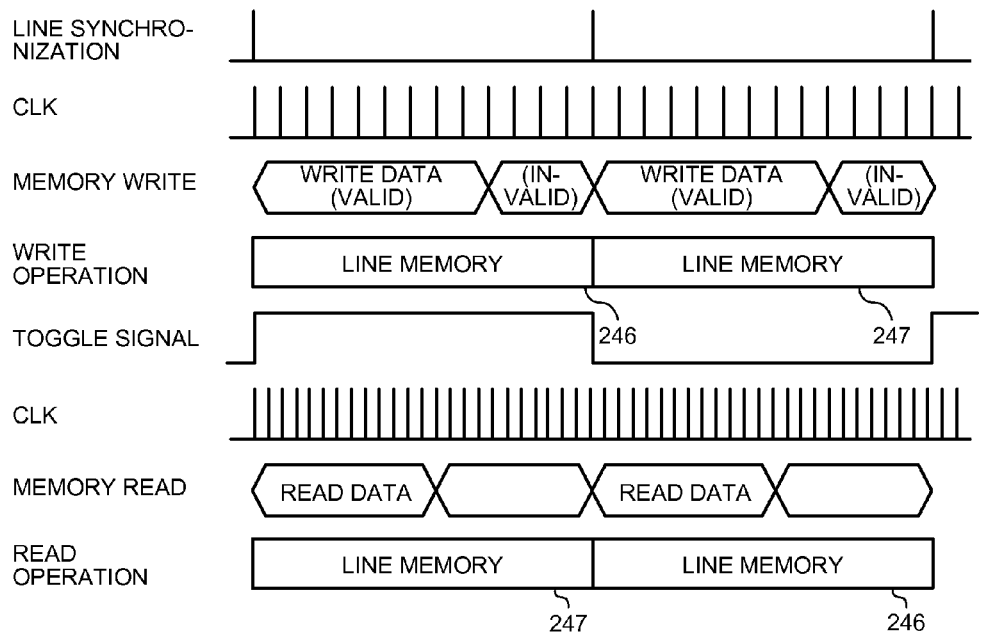
FIG. 7 is a view illustrating an example of toggle control according to the embodiment of the present invention.

An explanation will be made of the timing of the toggle control in the toggle control performed on the line memories 246 and 247 explained in FIG. 5 and the toggle control performed on the line memories 256 and 257 explained in FIG. 6 with reference to FIG. 7. In FIG. 7, two line memories are represented by a line memory A and a line memory B. Because the timing to switch the memories, which is a toggle operation, is the same in the scanner 10 and the plotter 20, the explanations thereof will be made collectively.

A line synchronization signal corresponds to a scanner synchronization signal or a plotter output synchronization signal and is a signal of one pulse or several clocks that becomes "High" at a reference timing for each line. CLK corresponds to a clock selected and output by the clock selector 221 in the case of the scanner 10 or a clock selected and output by the clock selector 235 in the case of the plotter 20. Memory write corresponds to a data signal selected and output by the data selector 222 in the case of the scanner 10 or a data signal selected and output by the data selector 231 in the case of the plotter 20.

In a memory write operation, writing is performed only in a valid data period. The read image data of one line in the scanner 10 and the output target image data of one line to be input to the plotter 20 are classified into "valid data" and "invalid data" as indicated in the "memory write" in FIG. 7. In other words, in the memory write operation, writing of data is performed only in the valid data period in a synchronization signal in one line, and no writing is performed in an invalid data period.

Selection of the line memory in writing is performed with a toggle signal. Furthermore, selection of the line memory in reading is also performed with a toggle signal. As described above, if one of the line memories performs a write operation, the other of the line memories performs a read operation.

FIG. 7 illustrates an example in which a clock of an external interface, that is, a clock selected by the clock selector 221 or the clock selector 235 is slower than an operating clock for internal image processing, that is, an operating clock output from the PLL 213. If the clock frequency in the internal image processing is higher, memory reading is performed at high speed. As a result, the period for reading data is shorter than the period for writing data as illustrated in FIG. 7. In the reverse situation, the period for reading data is made longer than the period for writing data. The period for writing data needs to fall within a period of one line.

Figure 8:
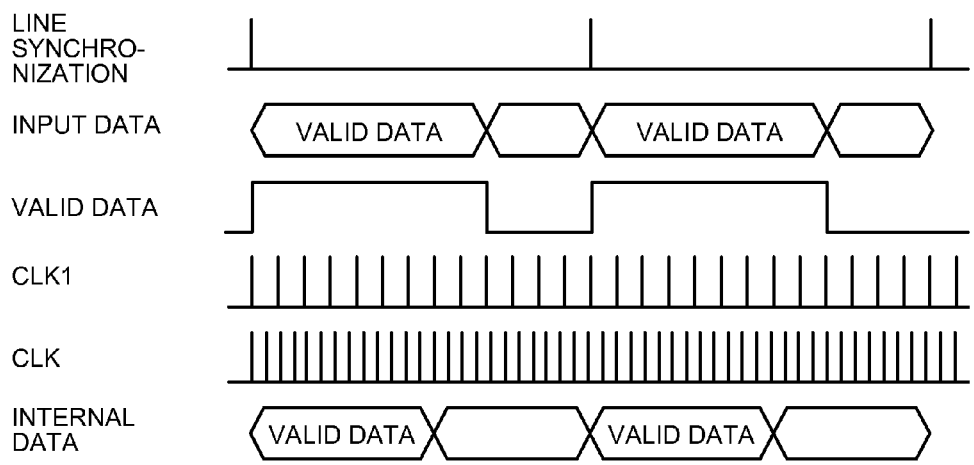
FIG. 8 is a view illustrating an operation timing of a line memory module according to the embodiment of the present invention.

FIG. 8 illustrates an example in which the frequency of an internal clock of the input image processing unit 216 is higher than that of a reference clock of input data from the scanner 10 and CLK1 is selected by the clock selector 221. The data from the scanner 10 is line-synchronized with a line synchronization signal input for each line. Among the data input in the period of one line, data input while a valid data signal is "High" is valid data, and data input while the valid data signal is "Low" is invalid data.

If the valid data input based on CLK1 is processed in the input image processing unit 216, the valid data period is made shorter because the operating clock of the input image processing unit 216, that is, the clock output from the PLL 213 is faster. However, the number of pieces of valid data does not change.

Figure 9:
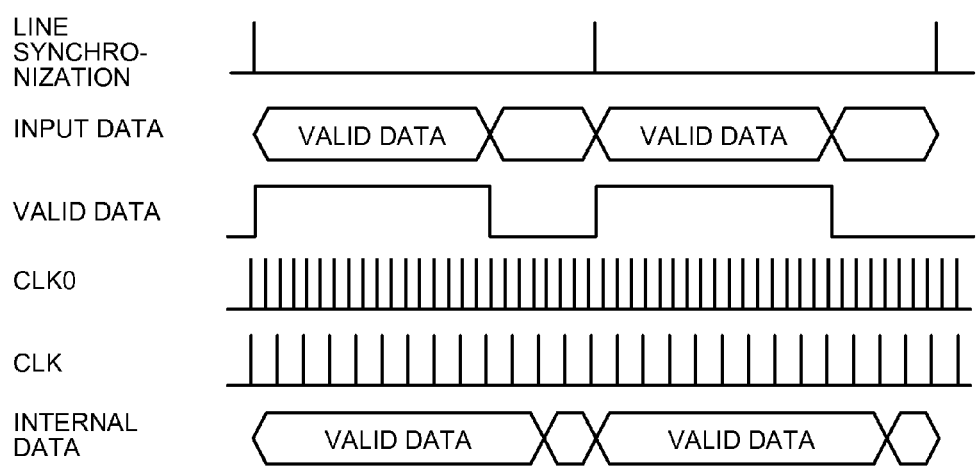
FIG. 9 is another view illustrating an operation timing of the line memory module according to the embodiment of the present invention.

By contrast, FIG. 9 illustrates an example in which the frequency of an input data reference clock from the scanner 10 is higher than that of an internal clock of the input image processing unit 216. Because the fastest clock is used as the internal clock in the present embodiment, the image processing apparatus 1 does not fall into the state illustrated in FIG. 9. However, as one example, an explanation will be made of the case where CLK0 that is a tentative clock faster than the clock output from the PLL 213 is selected by the clock selector 221.

The valid data from the scanner 10 is input at the frequency of CLK0 in the period during which the valid data signal is "High". Assume the internal clock is CLK4', CLK4'<CLK0 is satisfied. As a result, the valid data period for the internal clock is made longer than the valid data period for the input data.

Therefore, if the internal clock is slower, data transfer to the input image processing unit 216 needs to be finished in the period of one line for the input. Consequently, processing needs to be performed at the operating frequency that satisfies this condition. Furthermore, the relationship between the operating frequencies has an effect on the number of line memories. The relationship between the operating frequencies of the output clock system and the internal image processing clock system in the case of the plotter 20 is similar to the relationship described above.

As described above, the image processing apparatus 1 including the image processing ASIC 210 according to the present embodiment has a plurality of data input-output systems and clock supply systems and operates based on the system selected under the control of the CPU 201. Therefore, the image processing apparatus 1 can provide an image processing ASIC compatible with various clock patterns.

The image processing ASIC 210 according to the present embodiment supplies a clock at the highest frequency as the operating clock of the internal image processing circuit among the clocks of the systems. Therefore, the image processing ASIC 210 can complete the internal image processing without falling behind an operation timing of a device, such as the scanner 10 and the plotter 20, on which line synchronization needs to be performed.

Figure 10:
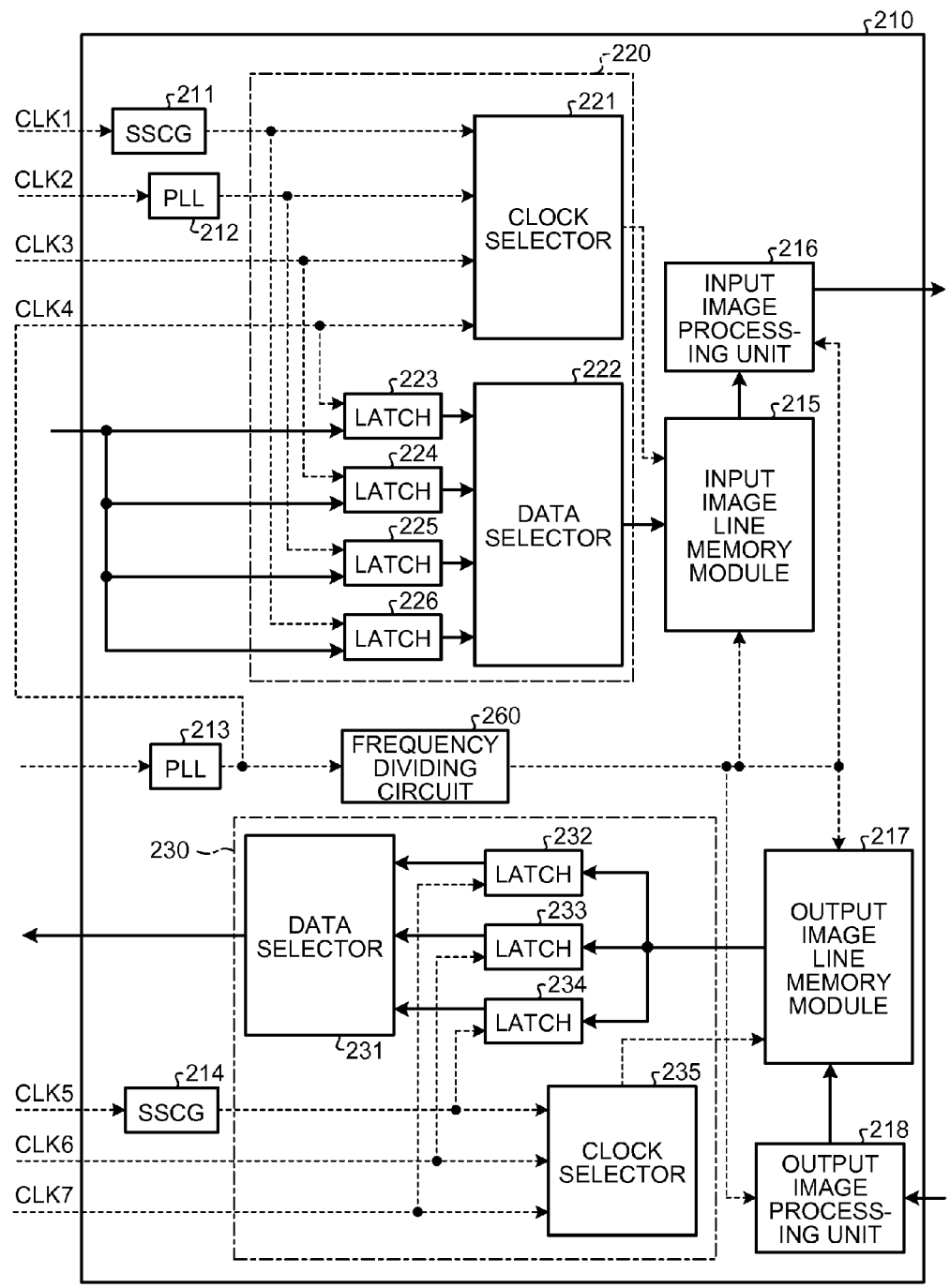
FIG. 10 is a diagram of a configuration of an image processing ASIC according to a first modification of the embodiment of the present invention.

In the present embodiment, the explanation has been made of the case where the clock multiplied by the PLL 213 is supplied as the internal operating clock of the image processing ASIC 210. However, as illustrated in FIG. 10, the clock multiplied and output by the PLL 213 may be divided and output by a frequency dividing circuit 260. As a result, the internal operating clock is made selectable, whereby it is possible to provide a system configuration with a larger variety of clocks.

Figure 11A:
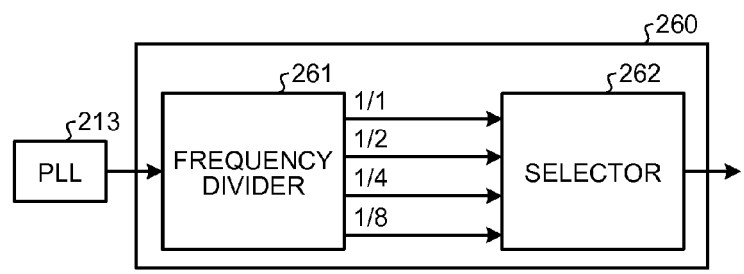
FIGS. 11A to 11C are diagrams of a configuration of a frequency dividing circuit according to the first modification of the embodiment of the present invention.

As illustrated in FIG. 11A, the frequency dividing circuit 260 includes a frequency divider 261 that can output clocks of 1/1, 1/2, 1/4, and 1/8 and a selector 262 that selects and outputs each clock. The selector 262 selects and outputs any one of the clocks under the control of the CPU 201.

Figure 11B:
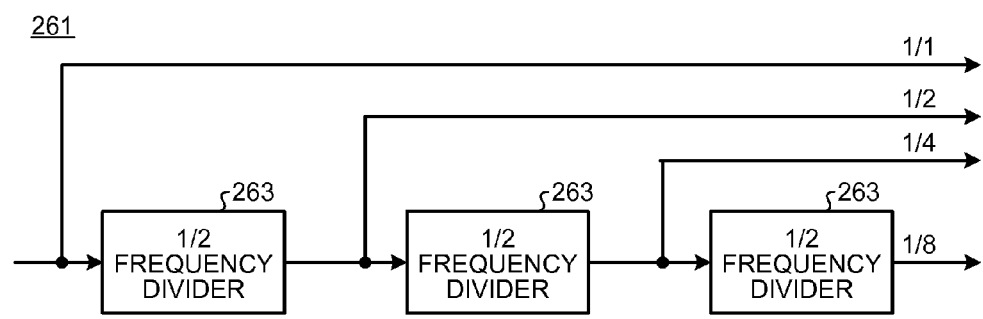
Figure 11C:
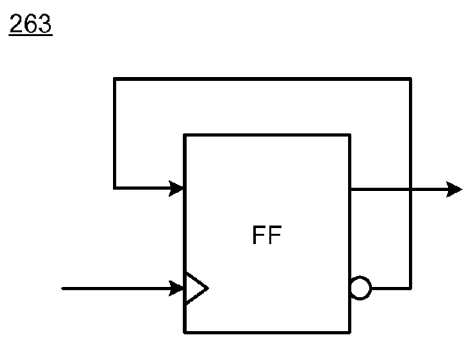

In the frequency divider 261, as illustrated in FIG. 11B, three 1/2 frequency dividers 263 are connected in series, and an output from each connected section is extracted. In the 1/2 frequency divider 263, as illustrated in FIG. 11C, a clock supplied from the PLL 213 is input to a clock terminal of a flip flop (FF), the clock inverted by the FF is input to an input terminal of the FF, and a signal thus output is used as a 1/2-divided signal.

If the frequency of an external clock input to the PLL 213 is 30 MHz and the clock is sextupled by the PLL 213, for example, the frequency of the clock divided by such a circuit can be selected from 180 MHz, 90 MHz, 45 MHz, and 22.5 MHz. The division ratio is not limited to 1/2, and a desired division ratio, such as 1/3, may be employed depending on the circuit configuration.

By providing the frequency dividing circuit for the operating clock of the internal image processing unit and making the clocks thus obtained selectable in this manner, it is possible to change the frequency of the internal operation without changing the original clock input to the PLL 213. Thus, even if the external clock input to the PLL 213 cannot be changed because the external clock is shared by other devices, for example, it is possible to change the frequency of the internal operation alone.

Furthermore, in the present embodiment, the explanation has been made of the case where the clock multiplied and output by the PLL 213 is supplied to the internal circuit for the scanner 10 and the internal circuit for the plotter 20 as illustrated in FIG. 4. In the system configuration of the apparatus, however, the clock of the internal circuit for the scanner 10 may possibly be different from the clock of the internal circuit for the plotter 20.

Figure 12:
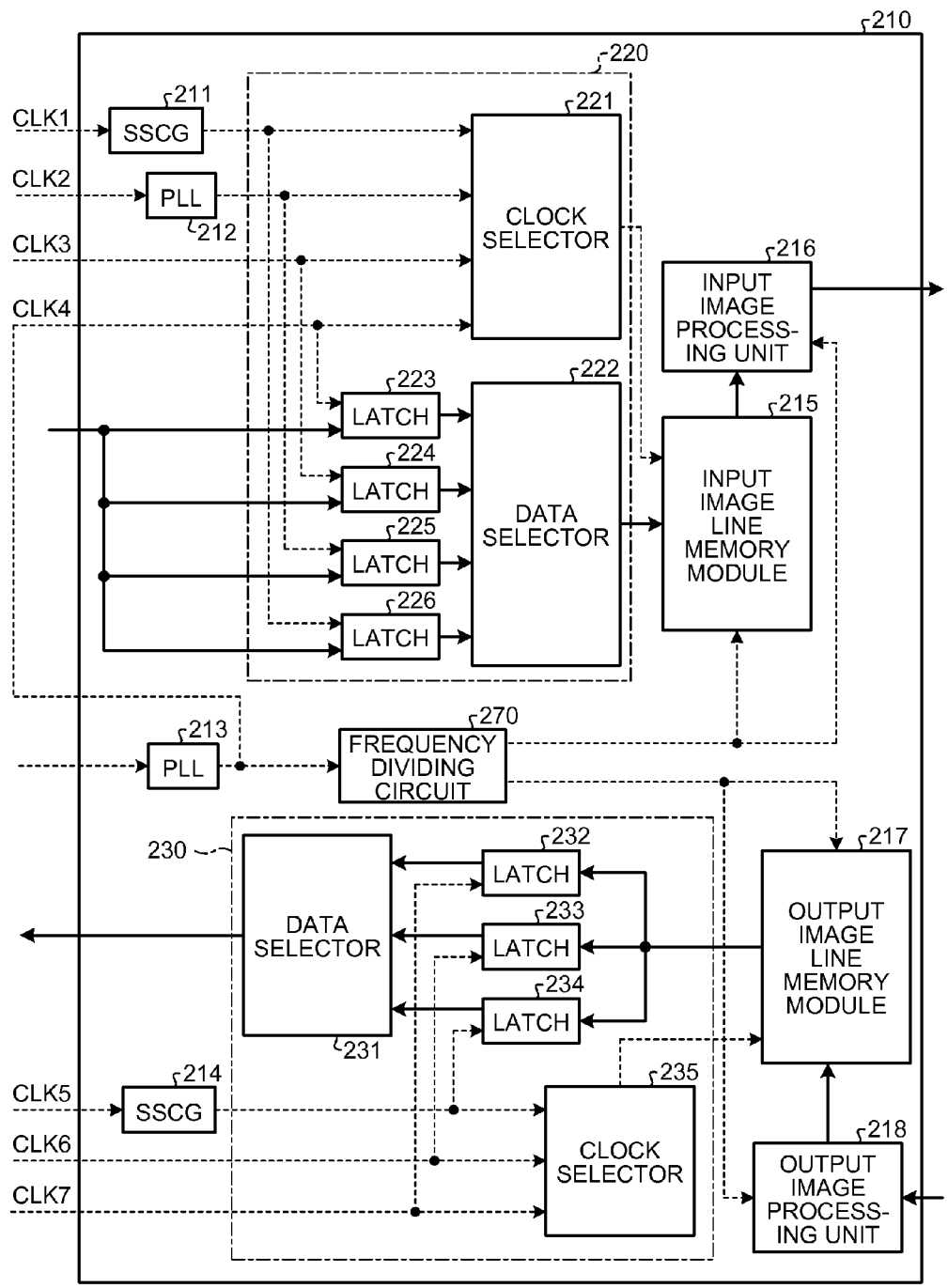
FIG. 12 is a diagram of a configuration of an image processing ASIC according to a second modification of the embodiment of the present invention.
Figure 13:
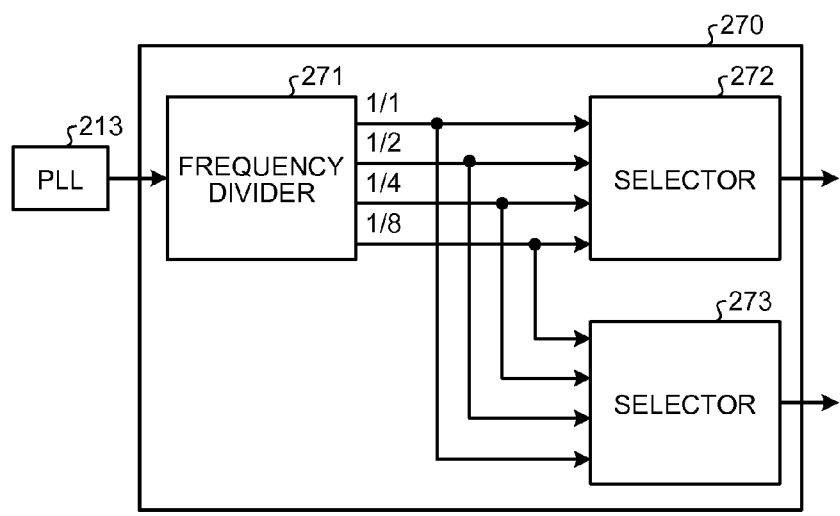
FIG. 13 is a diagram of a configuration of a frequency dividing circuit according to the second modification of the embodiment of the present invention.

In this case, as illustrated in FIG. 12, by inputting a clock to a frequency dividing circuit 270 and outputting the clock to different systems for the internal circuit for the scanner 10 and that for the plotter 20, the image processing apparatus 1 is made compatible with the different clocks. In the frequency dividing circuit 270 in FIG. 12, as illustrated in FIG. 13, clock signals divided by a frequency divider 271 can be selected by selectors 272 and 273 provided for the internal circuit for the scanner 10 and that for the plotter 20, respectively. This configuration makes it possible to supply different clocks to the internal circuit for the scanner 10 and that for the plotter 20 under the control of the CPU 201.

While the explanation has been made of the case where two line memories are provided for a data signal of one color in the present embodiment, it is given just as an example. Alternatively, one line memory may be provided for a data signal of one color. An explanation will be made of such an example below.

Figure 14:
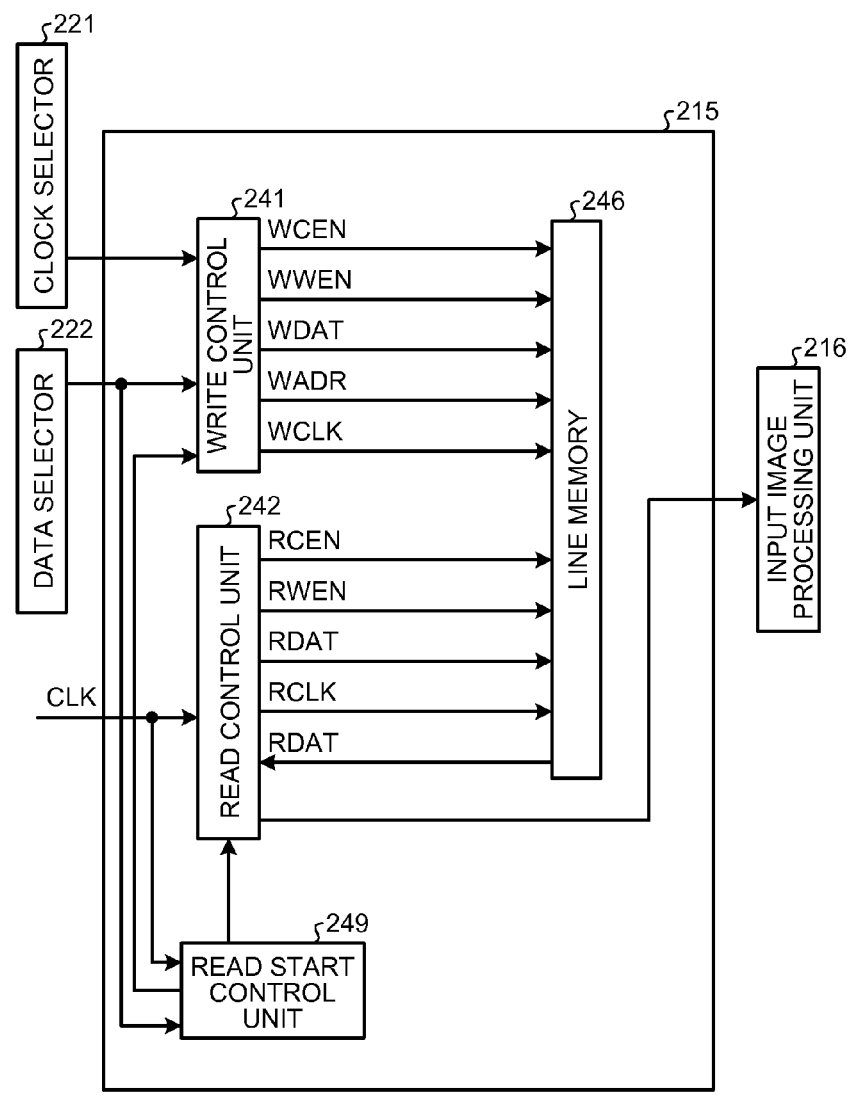
FIG. 14 is a diagram of a configuration of an input image line memory module according to a third modification of the embodiment of the present invention.

FIG. 14 illustrates an example in which the input image line memory module 215 includes one line memory. In the input image line memory module 215 illustrated in FIG. 14, the line memories 246 and 247 explained in FIG. 5 are replaced by a memory that can make write access and read access simultaneously with a two-port RAM and first-in, first-out (FIFO), for example.

The input image line memory module 215 of the configuration illustrated in FIG. 14 includes the write control unit 241, the read control unit 242, and the line memory 246 among the components explained in FIG. 5 and includes a read start control unit 249. Also in the input image line memory module 215 illustrated in FIG. 14, a data signal selected by the data selector 222 and a clock signal selected by the clock selector 221 under the control of the CPU 201 are input to the write control unit 241 similarly to the configuration explained in FIG. 5. The write control unit 241 then performs control for writing image data received from the data selector 222 to the line memory 246.

The write control unit 241 outputs an enable signal WCEN, a write enable signal WWEN, data WDAT, and an address WADR as signals for write control. The read control unit 242 reads image data written in the line memory 246 to transmit the data to the input image processing unit 216.

The read control unit 242 receives a clock synchronized with the operating clock of the input image processing unit 216, that is, CLK serving as a clock output from the PLL 213 and receives, from the read start control unit 249, a timing signal indicating a timing to start reading data from the line memory 246. The read control unit 242 outputs an enable signal RCEN, a read enable signal RREN, data RDAT, and an address RADR as signals for read control from the read control unit 242.

The timing at which data is read from the line memory will now be described. The timing at which data is read depends on which frequency of the external clock received from the clock selector 221 and the internal clock received from the PLL 213 is higher.

Figure 15:
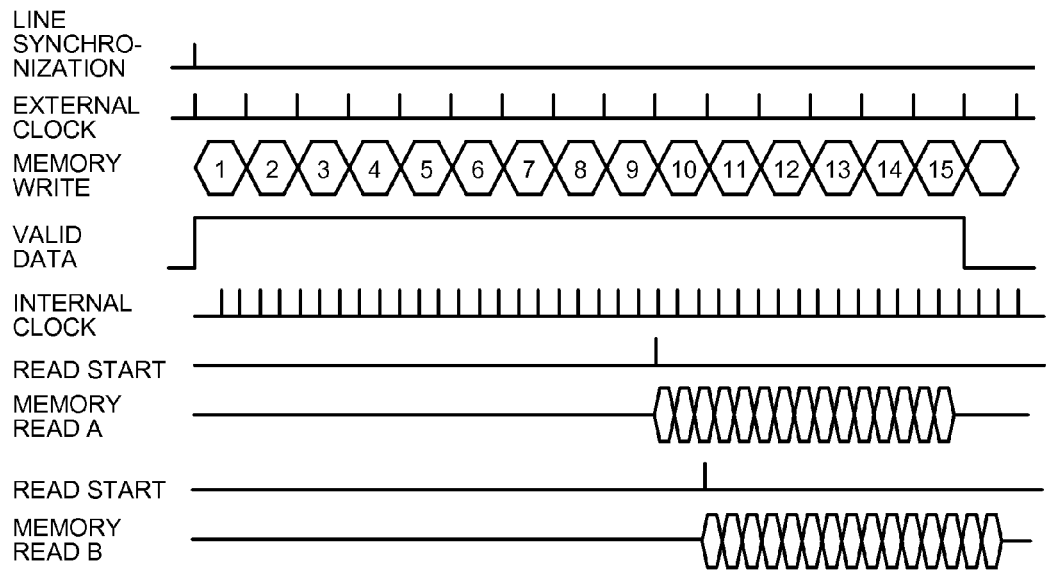
FIG. 15 is a view illustrating an operation timing of a line memory module according to the third modification of the embodiment of the present invention.
Figure 16:
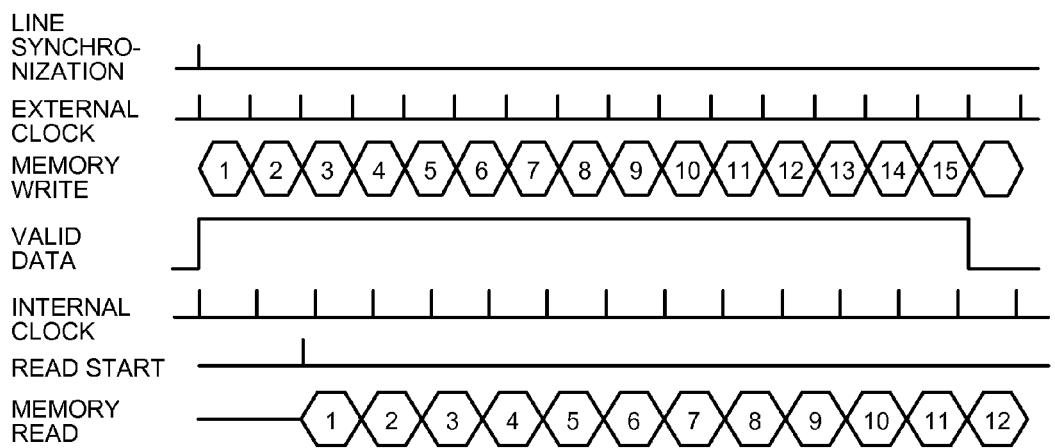
FIG. 16 is another view illustrating an operation timing of the line memory module according to the third modification of the embodiment of the present invention.

FIG. 15 is a timing chart illustrating the case where the internal clock is faster than the external clock. By contrast, FIG. 16 is a timing chart illustrating the case where the internal clock is slower than the external clock. Both in FIG. 15 and FIG. 16, an assumption is made that data of one line is 15 pieces of data.

If input data supplied from the scanner 10 is written to the line memory 246 with a clock slower than the internal clock, valid data is input based on the line synchronization signal serving as a line reference signal, and data "1" to "15" is written in synchronization with the external clock as illustrated in FIG. 15.

Reading of data from the line memory 246 is started with reference to a read start signal supplied from the read start control unit 249. As illustrated in FIG. 15, the read start control unit 249 inputs a read start signal to the read control unit 242 at a certain timing. The timing to input the read start signal is determined based on the external clock, the internal clock, and the valid data length of one line.

Assume the frequency of the external clock is $C_1$, the frequency of the internal clock is $C_2$, and the valid data length (the number of pieces of data) is L, the start timing can be expressed by Equation (1):

$$L \times (1 - C_1/C_2) \tag{1}$$

If L is 15 pieces of data, $C_2$ is 100 MHz, and $C_1$ is 40 MHz, for example, the result of Equation (1) is 9. In other words, if the read start signal is generated after writing of the "9"th data of the valid data, the timing of writing of the "15"th data is synchronized with the "15"th memory read timing as indicated by a memory read timing A in FIG. 15.

In the case of the memory read timing A in FIG. 15, the timing of the last data for memory writing and that of the last data for memory reading may possibly be the same. In this case, read access may possibly be generated before writing of the data to the line memory 246 is finished. To address this, by delaying the read start by α (data) to start memory reading at the timing calculated by Equation (2), it is possible to complete writing and reading data without any problem as indicated by a memory read timing B in FIG. 15.

$$L \times (1 - C_1/C_2) + \alpha \tag{2}$$

Such timing control performed by the read start control unit 249 is realized under the control of the CPU 201. In other words, the CPU 201 sets the valid data length of one line, the frequency of each clock, and the start delay amount in an internal register, for example, and the read start control unit 249 generates the timing described above in accordance with the set values. The value α is preferably set such that the period for reading data falls within the length of one line.

By contrast, if data is written to the line memory 246 with a clock faster than the internal clock as illustrated in FIG. 16, there is no problem because read access does not get ahead of write access as long as the first write access and the first read access are not generated synchronously. In this case, however, reading of data needs to be completed in a one-line synchronization period (the valid data length and the invalid data length).

Figure 17:
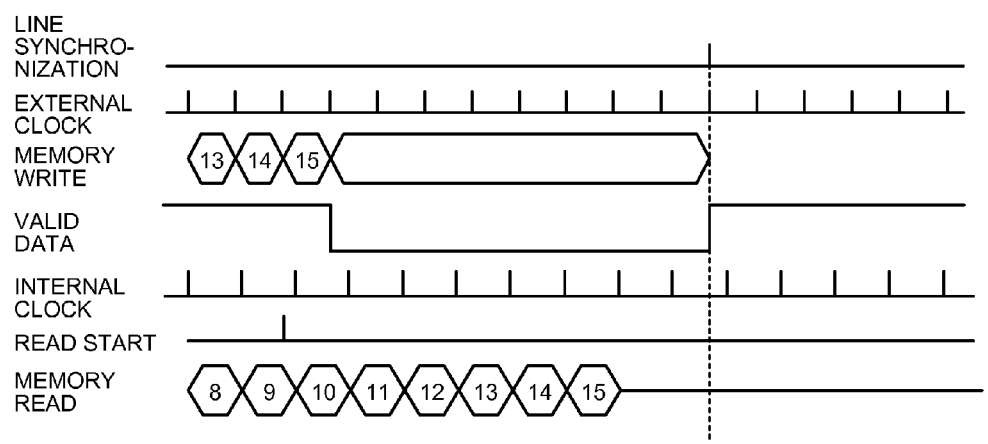
FIG. 17 is still another view illustrating an operation timing of the line memory module according to the third modification of the embodiment of the present invention.
Figure 18:
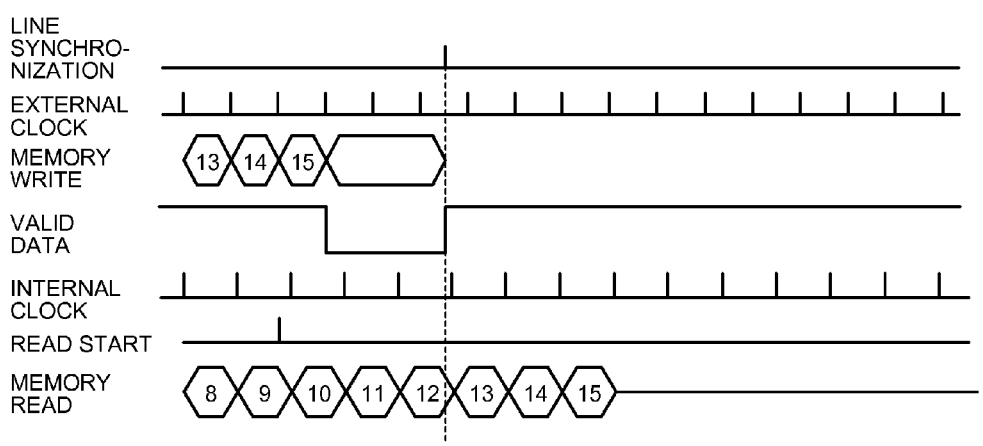
FIG. 18 is still another view illustrating an operation timing of the line memory module according to the third modification of the embodiment of the present invention.
Figure 19:
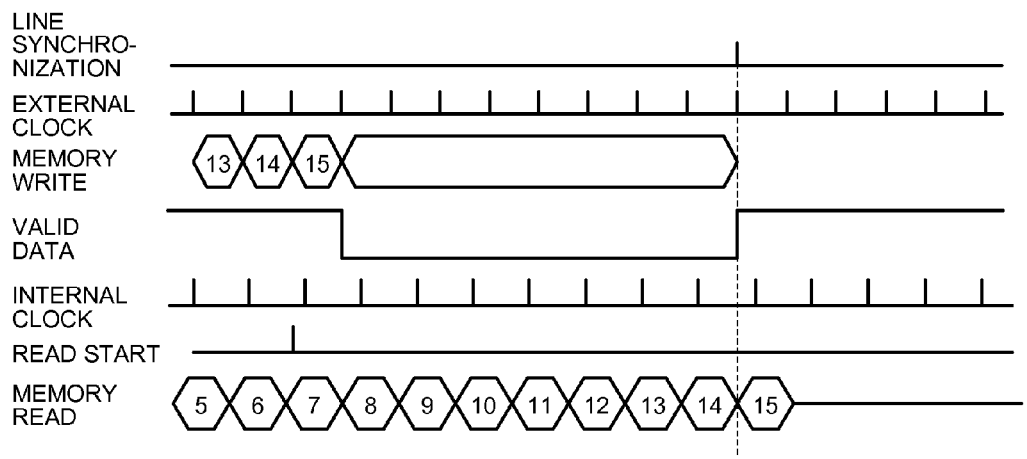
FIG. 19 is still another view illustrating an operation timing of the line memory module according to the third modification of the embodiment of the present invention.

If memory reading is completed before the subsequent line synchronization signal as indicated by the memory read timing in FIG. 17, for example, there is no problem. By contrast, if the invalid data period is short as illustrated in FIG. 18 or if the read start is delayed as illustrated in FIG. 19, for example, memory reading fails to be completed in the invalid data period. As a result, image data written in the line memory 246 cannot be completely read. Thus, the start delay amount α needs to be set also in consideration of these situations.

Therefore, assume the line synchronization period (the valid data and the invalid data) is N, the valid data length is L, the frequency of the external clock is $C_1$, the frequency of the internal clock is $C_2$, and delay of the read start timing is α (data), conditions expressed by Equation (3) are required.

$$N \times C_1/C_2 + \alpha > L \quad (3)$$

By operating the read start control unit 249 based on Equation (2) and Equation (3), it is possible to configure the input image line memory module 215 with one memory. Furthermore, by operating the read start control unit in the same manner, it is possible to configure the input image line memory module 215 with one memory also for the internal circuit for the plotter 20.

Second Embodiment

Figure 20:
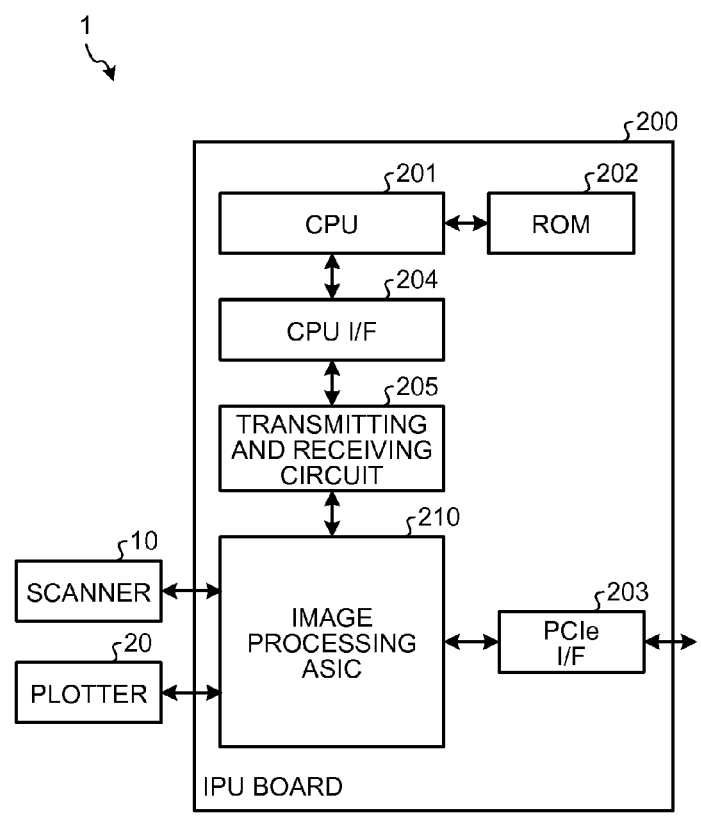
FIG. 20 is a diagram of a configuration of an IPU board according to a second embodiment of the present invention.

In a second embodiment of the present invention, a transmitting and receiving circuit 205 that transmits and receives data between a CPU I/F 204 with which the CPU 201 is mounted on an IPU board 200 and an image processing ASIC 210 is provided as illustrated in FIG. 20, and the clock system of the CPU I/F 204 is different from the clock system of the inside of the image processing ASIC 210.

An internal clock of the image processing ASIC 210 is a clock output from a PLL 213 as explained in FIG. 4 (hereinafter, referred to as an internal clock). A clock of the CPU I/F 204 is a clock of the CPU 201 or a control signal received from the CPU 201 (hereinafter, referred to as a CPU clock). The internal clock or the CPU clock is supplied to the transmitting and receiving circuit 205, and the transmitting and receiving circuit 205 can transmit and receive data while absorbing asynchronization between the internal clock and the CPU clock.

FIG. 21 is a timing chart of read access in the CPU I/F 204. As illustrated in the timing chart of FIG. 21, to make read access from the CPU 201 to the image processing ASIC 210, a control signal generated based on the CPU clock is input. FIG. 21 is a timing chart of read access from the CPU 201, and a CPU clock CPU_CLK, an address signal CPU_A, a chip select signal CPU_CS_N, a read enable signal CPU_RD_N, and a read data signal CPU_RDATA are input as control signals for access, for example.

To make write access, a write enable signal CPU_WR_N and a write data signal CPU_WDATA are input to the CPU I/F 204 in addition to CPU_A, CPU_CS_N, CPU_RD_N, and CPU_RDATA illustrated in FIG. 21.

To make read access, data of CPU_A obtained when CPU_CS_N and CPU_RD_N are asserted is used to make access to a register or a RAM corresponding to an address mapped in the image processing ASIC 210. The image processing ASIC 210 then outputs data of the register or the RAM thus accessed to the outside thereof, that is, to the CPU 201 as CPU_RD_DATA.

Because the CPU clock CPU_CLK is not synchronized with the internal clock CLK, a signal used for access from the CPU is also asynchronous. The transmitting and receiving circuit 205 absorbs the asynchronization between the CPU I/F 204 and the inside of the image processing ASIC 210. If access is made from the CPU as illustrated in FIG. 21, the image processing ASIC 210 performs processing according to the internal clock CLK serving as a clock at frequency higher than that of the CPU clock CPU_CLK.

By using the address signal CPU_A from the CPU as ADDR, the chip enable signal CPU_CS_N as CS_N, and the read enable signal CPU_RD_N as RD_N, access is made to the image processing ASIC 210. Each of the signals is synchronized with the internal clock by an asynchronization-capable circuit in the transmitting and receiving circuit 205 to generate an internal access signal.

Each of the signals CPU_A, CPU_CS_N, and CPU_RD_N synchronized with CPU_CLK receives data from the asynchronization-capable circuit in the transmitting and receiving circuit 205. To deal with metastable occurring when data is transmitted and received to and from an asynchronous FF, for example, the signal generated in the asynchronization-capable circuit is generated as a signal hit at several stages in the FF. Thus, the CPU_A signal is converted into the ADDR signal. Similarly, the CPU_CS_N signal is converted into CS_N, and the CPU_RD_N signal is converted into RD_N.

As a result, RD_DATA serving as data read from the register or the RAM in the image processing ASIC 210 is synchronized with the CPU_CLK and is output to the CPU 201 as CPU_RDATA.

With the operational configuration described above, even if an external CPU I/F has a different clock system, the transmitting and receiving circuit 205 can absorb the asynchronization. As a result, the image processing ASIC 210 can be configured as a circuit independent of the CPU clock system and be compatible with various external I/Fs.

According to the present invention, it is possible to provide a signal processing circuit compatible with various clock patterns.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A signal processing circuit that transfers a signal between an externally connected device and an internal circuit, the signal processing circuit comprising:
a clock selecting unit that selects and outputs any one of clocks received from a plurality of different systems;
a plurality of data latch units that respectively latch, according to the respective clocks received from the systems, input data to form latched data;
a data selecting unit that selects and outputs, among the latched data, a piece of the latched data latched according to the selected clock; and
a data retaining unit that temporarily retains the piece of the latched data between the data latch units and the internal circuit, wherein
when the piece of the latched data is processed between the data retaining unit and the internal circuit, the data retaining unit operates according to an operating clock of the internal circuit, but when the piece of the latched data is processed between the data retaining unit and the data latch units, the data retaining unit operates according to the selected clock.

2. The signal processing circuit according to claim 1, wherein the operating clock of the internal circuit is a clock having a highest frequency among the clocks received from the systems.

3. The signal processing circuit according to claim 2, further comprising:
a multiplying circuit configured to generate the operating clock supplied to the internal circuit by multiplying the clocks received from the systems, wherein the clocks received from the systems and multiplied by the multiplying circuit are delayed such that the operating clock has the highest frequency.

4. The signal processing circuit according to claim 1, further comprising:
a frequency dividing circuit that divides a clock being supplied such that the frequency dividing circuit generates a plurality of clocks with different division ratios and outputs one of the plurality of clocks as the operating clock of the internal circuit.

5. The signal processing circuit according to claim 4, wherein the frequency dividing circuit uses the plurality of clocks with different division ratios to respectively output a first clock and a second clock, the first clock and the second clock having different division ratios, to a first internal circuit that processes information to be supplied to the externally connected device and a second internal circuit that processes information supplied from the externally connected device.

6. An image processing apparatus comprising:
an image processing engine;
an image processing circuit; and
a signal processing circuit that transfers a signal between the image processing engine and the image processing circuit, wherein
the signal processing circuit includes:
a clock selecting unit that selects and outputs any one of clocks received from a plurality of different systems;
a plurality of data latch units that respectively latch, according to the respective clocks received from the systems, input data to form latched data;
a data selecting unit that selects and outputs, among the latched data, a piece of the latched data latched according to the selected clock; and
a data retaining unit that temporarily retains the piece of the latched data between the data latch units and the image processing circuit, and wherein
when the piece of the latched data is processed between the data retaining unit and the image processing circuit, the data retaining unit operates according to an operating clock of the image processing circuit, but when the piece of the latched data is processed between the data retaining unit and the data latch units, the data retaining unit operates according to the selected clock.

7. A signal processing method for transferring a signal between an externally connected device and an internal circuit, the signal processing method comprising:
selecting and outputting any one of clocks received from a plurality of different systems;
respectively latching, according to the respective clocks received from the systems, data being input to form latched data;
selecting and outputting, among the latched data, a piece of the latched data latched according to the selected clock; and
temporarily retaining the piece of the latched data in a storage medium between a data latch unit that latches the piece of the latched data and the internal circuit, wherein
at the temporarily retaining the piece of the latched data in the storage medium, when the piece of the latched data is processed between the storage medium and the internal circuit, the piece of the latched data is processed according to an operating clock of the internal circuit, but when the piece of the latched data is processed between the storage medium and the data latch unit, the piece of the latched data is processed according to the selected clock.

* * * * *